United States Patent [19]

Rossi

[11] Patent Number: 4,562,031
[45] Date of Patent: Dec. 31, 1985

[54] PROCESS FOR CASTING REINFORCED TIRES

[75] Inventor: Robert K. Rossi, Akron, Ohio

[73] Assignee: The Goodyear Tire & Rubber Company, Akron, Ohio

[21] Appl. No.: 344,985

[22] Filed: Feb. 2, 1982

[51] Int. Cl.[4] .......................... B60C 1/00; B22H 3/08
[52] U.S. Cl. ..................................... 264/255; 156/125; 264/311; 264/326; 264/328.3
[58] Field of Search ............... 156/125, 126, 128.1, 156/128.6, 129, 127, 74; 264/251, 255, 311, 312, 310, 326, 328.3, 275, 267, 270; 152/357 A

[56] References Cited

U.S. PATENT DOCUMENTS

| | | | |
|---|---|---|---|
| 2,902,072 | 9/1959 | Reuter | 152/330 |
| 3,458,373 | 7/1969 | Knipp et al. | 156/125 |
| 3,701,374 | 10/1972 | McGillvary | 152/357 A |
| 3,775,528 | 11/1973 | Beneze | 156/125 |
| 3,855,177 | 12/1974 | Sanda, Jr. | 152/357 A |
| 3,888,291 | 6/1975 | Herzlich et al. | 152/330 R |
| 3,936,576 | 2/1976 | Kay | 152/357 A |
| 4,044,811 | 9/1977 | Dudek et al. | 152/354 |
| 4,105,482 | 8/1978 | Wopelhorst et al. | 156/96 |
| 4,185,065 | 1/1980 | Knipp et al. | 264/312 |
| 4,201,744 | 5/1980 | Makinson | 156/125 |
| 4,253,513 | 3/1981 | Larson et al. | 156/125 |
| 4,257,836 | 3/1981 | Beneze | 264/326 |
| 4,272,309 | 6/1981 | Payne et al. | 156/125 |

FOREIGN PATENT DOCUMENTS

| | | | |
|---|---|---|---|
| 0006425 | 1/1980 | European Pat. Off. | |
| 2249172 | 4/1973 | Fed. Rep. of Germany | 152/357 A |
| 2619942 | 11/1977 | Fed. Rep. of Germany | 156/125 |
| 2830331 | 1/1980 | Fed. Rep. of Germany | 156/125 |

Primary Examiner—Michael Ball
Attorney, Agent, or Firm—Frederick K. Lacher; H. C. Young, Jr.

[57] ABSTRACT

The method of molding a pneumatic tire having a radially outer tread portion, a tire casing underlying the tread portion and a reinforcing cord belt interposed between the tread portion and casing in which the tread portion is spin cast and then partially cured in the mold, the reinforcing cord belt is then fastened to the tread portion, a core inserted in the mold and the tire casing spin cast and cured. The reinforcing cord belt may be adhered to the tread portion by staples or a skim coat adhesive to hold the belt in place during the spin casting of the tire casing.

3 Claims, 6 Drawing Figures

PROCESS FOR CASTING REINFORCED TIRES

This invention relates generally to a process for molding a tire which is cast from a liquid-reactive elastomeric material such as urethane. It is especially directed to the incorporation of a belt of dimensionally stable reinforcing cords at a predetermined position under the tread for restricting radial growth of the tire.

It has been the practice to position the reinforcing cord fabric in a mold on pins projecting outwardly from the mold surface or on a serrated core holding ring. In other cases where a precast casing is placed in the mold first the cord fabric has been placed over the outer surface of the casing. It is important that the belt be positioned concentrically with the tire axis and be centered with respect to the midcircumferential plane of the tire so that the dynamic and static balance will be within acceptable limits. The use of pins has not been entirely satisfactory because the pins must be mounted on the mold and then are either embedded in the tire or leave holes in the tire when the tire is ejected from the mold. The pins are also subject to being broken off and are difficult to keep in alignment. Use of the serrated core holding ring is limited because it prevents the tread portion from being spin cast without the mold core in place. This is also true with a precast casing where the casing must be placed in the mold to support the belt.

The present invention is directed to a process of molding a toroidal article such as a tire in which the tread portion is spin cast and then partially cured in the tire mold. A reinforcing cord belt is fastened to the underside of the tread portion and then the core assembled and inserted in the mold after which the rest of the tire carcass may be spin cast and cured in the mold. The mold may then be opened for removal of the tire and disassembly and removal of the core from the tire.

In accordance with an aspect of the invention there is provided a method of molding a toroidal shaped pneumatic tire comprised of a radially outer tread portion, a tire casing underlying the tread portion and a reinforcing cord belt positioned between the tread portion and the tire casing; the method comprising the steps of forming the tread portion by placing elastomer forming material in the space at the radially outer portion of the mold and molding; reacting and at least partially curing the material; positioning the cord belt on the inside surface of the tread portion with the edges equidistant from a center plane of the tire; fastening the cord belt to the tread portion with fastening means; assembling and inserting a core member in the mold; forming the casing by introducing and rotationally casting a predetermined quantity of liquid reaction mixture of elastomer forming material into the space between the core, the mold and the tread portion; reacting and at least partially curing the mixture to form the casing overlapping and integrally adhered to the reinforcing cord belt and the tread portion; and removing the formed tire and core from the mold and removing the core from the tire.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however of but one of the various ways in which the principles of the invention may be employed.

Figure 1:
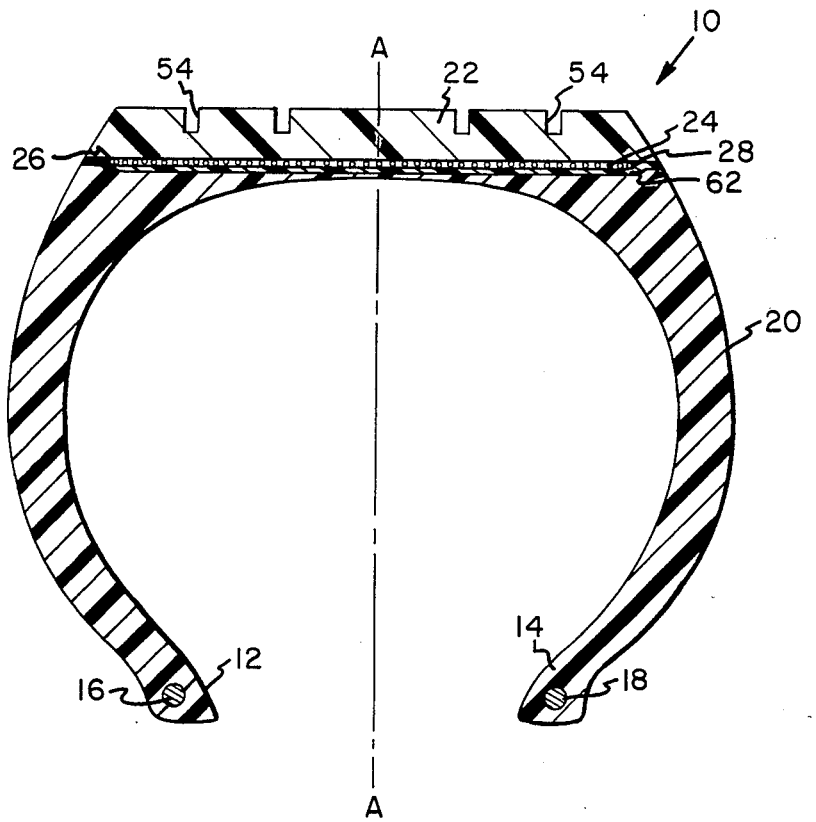
FIG. 1 is a cross-sectional view of a tire built in accordance with this invention.

Referring to FIG. 1, a section of a generally toroidal pneumatic tire 10 made in accordance with the invention is shown. The tire 10 has bead portions 12 and 14 containing annular beads 16 and 18 of wire or other relatively inextensible material. The bead portions 12 and 14 are adapted for mounting on a rim (not shown) of a wheel rotatable about an axis. By "pneumatic tire" is meant a tire having an air chamber therein which may or may not be under pressure during operation. Thus it includes pneumatic tires which rely on air pressure therein for support, also semi-pneumatic tires which do not entirely rely on air pressure within the chamber for support during operation.

A tire casing 20 extends from bead portion 12 to bead portion 14 and includes sidewalls and a crown portion. Radially outward of the tire casing 20 is a tread portion 22 extending circumferentially of the tire 10. Interposed between the tire casing 20 and tread portion 22 is a reinforcing cord belt 24 having edges 26 and 28 which are positioned equidistant from a midcircumferential plane A—A of the tire.

Figure 2:
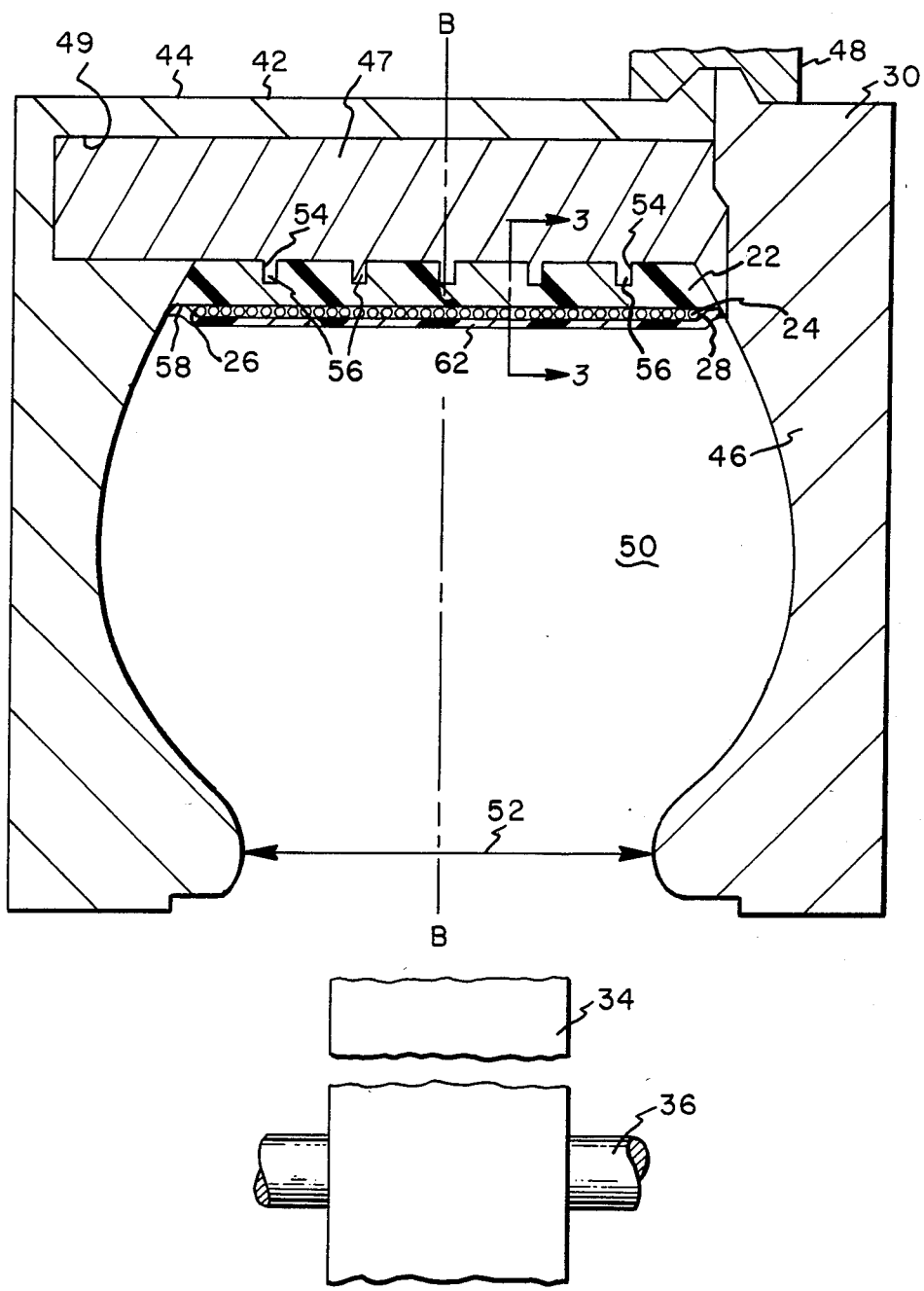
FIG. 2 is a schematic cross-sectional view of a mold for casting the tread portion of the tire by centrifugal casting showing the tread as cast and the reinforcing cord belt fastened to the tread.
Figure 6:
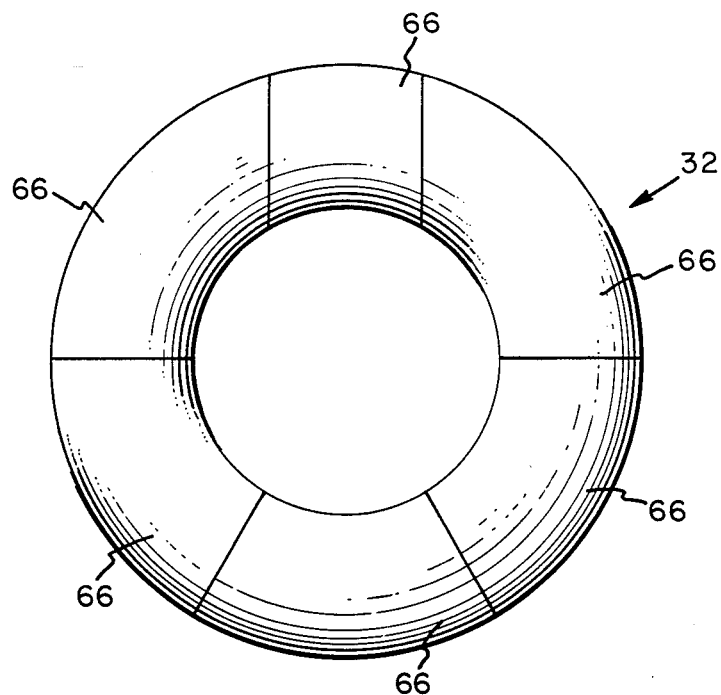
FIG. 6 is a schematic elevation showing the segmented collapsible core.
Figure 5:
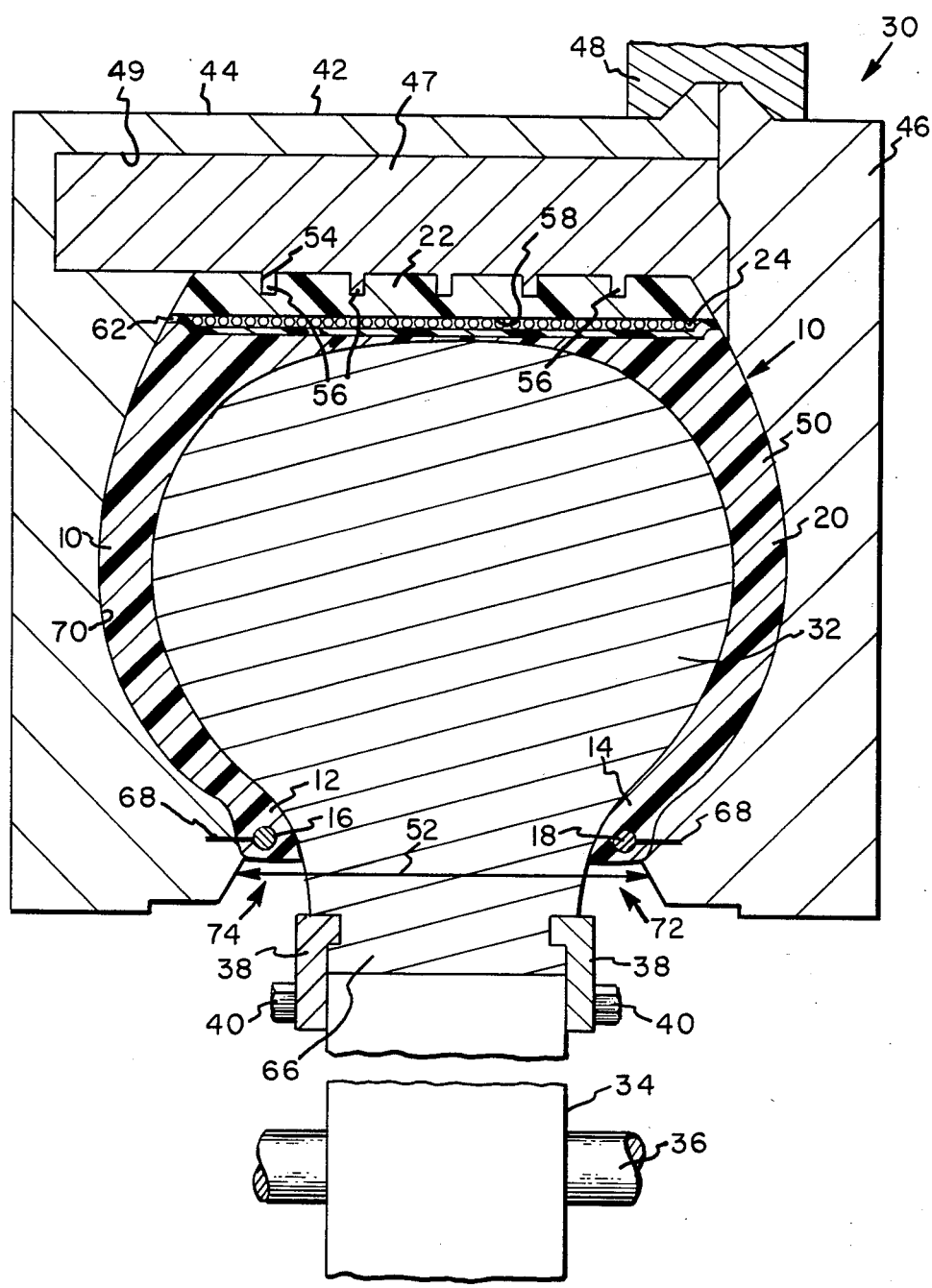
FIG. 5 is a view like FIG. 2 but showing the collapsible core assembled in position in the mold and the tire casing cast by centrifugal casting.

Apparatus for molding the tire 10 is shown in FIGS. 2, 5 and 6. In FIGS. 2 and 5, a rigid mold 30 is shown which may be adapted for spin or centrifugal casting. As shown in FIGS. 5 and 6, a collapsible core 32 is rotatably mounted on a flange 34 of a shaft 36 as by clamping rings 38 fastened to the flange by fasteners such as bolts and nuts 40. Positioned around the collapsible core 32 is an outer shell 42 including a lower mold section 44 and upper mold section 46 held together by a clamping ring 48 and also mounted on the shaft 36 for rotation with the collapsible core 32. A segmented tread ring 47 is supported in a circumferential groove 49 in the lower mold section 44.

Within the outer shell 42 is a mold cavity 50 for receiving a liquid reaction elastomer forming material to form the tread portion 22 of the tire 10. An opening 52 between the inner edges of the mold sections 44 and 46 provides an inlet and outlet through which the liquid reaction elastomer forming material may be poured and the mold vented. The tread portion 22, as shown in FIG. 2, may be made by centrifugal molding a liquid reaction mixture and curing it to form a suitable polyurethane composition having a hardness of about 90 Shore A to 50 Shore D. Such polyurethane can be prepared by methods well known to those having skill in the art such as, for example, by forming a liquid reaction mixture of and reacting (A) a polymeric polyol, such as a polyester polyol or polyether polyol, having a molecular weight in the range of from about 700 to about 10,000 and an average hydroxyl group functionality in the range of from about 2 to about 2.3, (B) a stoichiometric excess of organic polyisocyanate having an average isocyanate (NCO) functionality in the range of from about 2 to about 2.3, and (C) chain extending or curing with a diamine or monomeric polyol containing an average of 2 to 2.3 hydroxyl groups. Generally, the polyurethane can be formed by any of the well known prepolymer, quasi-prepolymer or one-shot methods. Usually the prepolymer or quasi-prepolymer method is preferred in which a product of reacting (A) and (B) is mixed with a curative (C) to form a reaction mixture.

The tread portion 22 may be made of a low modulus tread mixture of elastomeric material such as a suitable polyurethane of the type previously described and having a modulus in the range of from about 400 to about 1500 psi at 100 percent elongation, a Young's modulus in the range of from about 750 to about 1450 psi, an ultimate tensile strength in the range of from about 1500 to about 7000 psi, an ultimate elongation in the range of from about 500 to 1000 percent, a compression set below 25 percent and a glass transition temperature (Tg) below −30° C. By pouring a predetermined amount of the tread material into the mold cavity 50 only the radially outer portion of the cavity will be filled during centrifugal casting and provide the tread portion 22 which has a tread configuration with grooves 54 molded in the tread surface by ribs 56 in the tread ring 47.

Figure 3:
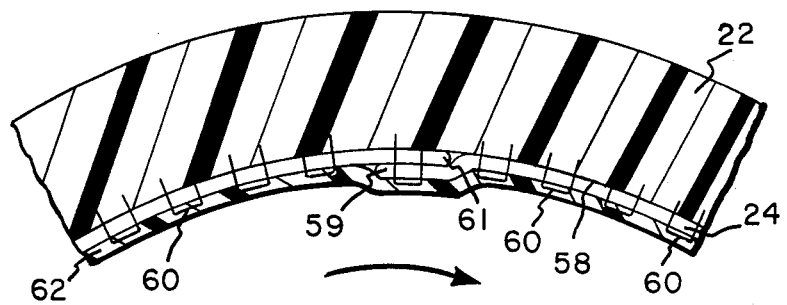
FIG. 3 is an enlarged fragmentary sectional view taken along the line 3—3 in FIG. 2 showing the fastening of the reinforcing cord belt to the tread portion by staples.

The tread portion 22 is partially cured under controlled temperatures in the mold 30 as by maintaining the mold at an elevated temperature of about 121° C. for a period of a few minutes up to several hours to at least partially cure the tread portion. Access to an inside surface 58 of the tread portion 22 is had with the upper mold section 46 removed for applying the belt 24 to the tread portion by suitable fastening means. The belt 24 is positioned with the edges 26 and 28 equidistant from a midcircumferential plane B—B of the mold 30 which corresponds with the midcircumferential plane A—A of the tire 10. Preferably the belt 24 has a length greater than the circumference of the inside surface 58 of the tread portion 22 and belt ends 59 and 61 are overlapped as shown in FIG. 3. The trailing end 59 overlaps the leading end 61 relative to the direction of rotation during spin casting in an amount such as ½ inch as shown by the arrow in FIG. 3. The belt 24 is preferably of one layer of a standard tire fabric having warp cords of a high modulus material connected by picks and treated to provide dimensional stability. The reinforcing warp cords of the layer may be of a suitable material such as rayon, nylon, polyester, glass, aramid or steel.

The lower mold section 44 of the mold 30 may be positioned in a spin casting apparatus (not shown) with the shaft 36 at an angle of from about 0 degrees to about 45 degrees to the horizontal so that upon rotation of the mold and pouring of the liquid reaction elastomer forming material in the opening 52 adjacent the lower mold section the material will be properly distributed and the mold vented. In this condition it is important that the belt 24 be maintained in a centered position on the tread portion 22 and therefore fastening means such as staples 60 are inserted as by pliers or other suitable mechanical means through the belt 24 and penetrate into the tread portion. Preferably the staples 60 are of a rigid or semi-rigid material of metal or polymers such as nylon and in this embodiment are one-eighth by one-eighth inch 30 gauge nichrome wire. After the belt 24 is fastened to the tread portion 22 by the staples 60, a centrifugally cast skim coat 62 of an adhesive such as reactive urethane mixture is preferably applied over the belt 24 and tread portion 22. The skim coat 62 provides improved mechanical stability to prevent movement of the belt 24 relative to the tread portion 22 during further molding of the tire 10.

Figure 4:
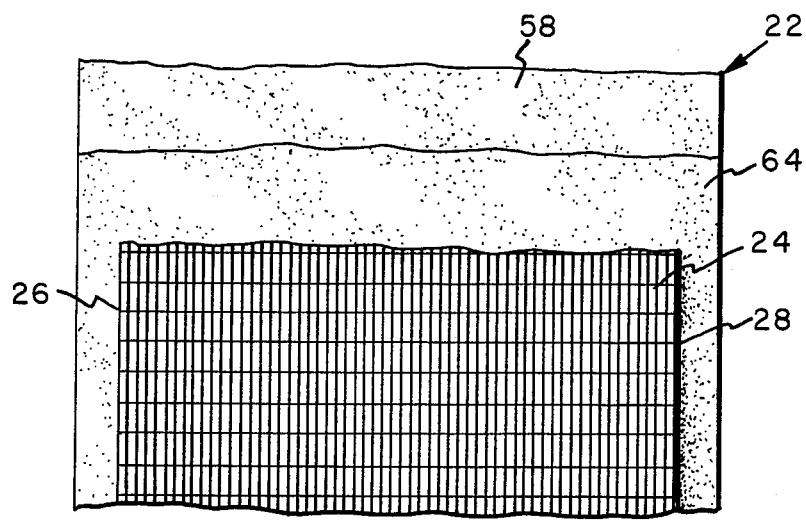
FIG. 4 is an enlarged fragmentary plan view of the inside of the tread portion and reinforcing cord belt showing a modification in which the belt is adhered to the tread portion by a skim coat of reactive urethane mixture centrifugally cast on the underside of the tread portion.

Alternatively where the reactive urethane mixture provides sufficient adhesion, the staples 60 and skim coat 62 may not be needed and instead prior to positioning the belt 24 on the tread portion 22 a tread adhesive such as a tread skim coat 64 may be applied to the inside surface 58 of the tread portion 22 as by centrifugal casting as shown in FIG. 4. After the tread skim coat 64 is applied, the belt 24 may be positioned as shown in FIG. 2.

With the belt 24 fastened to the tread portion 22 the assembled core 32 is placed within the mold cavity 50 as shown in FIG. 5. It is understood that the core 32 has segments 66 which can be assembled prior to inserting the core in the mold 30 and which can be disassembled for removal from the tire 10.

As shown in FIG. 5, the beads 16 and 18 are held in position by pins 68 fastened to the mold sections 44 and 46 and a tire casing cavity 70 is provided between the core 32 and mold sections and radially inward of the tread 22, belt 24 and skim coat 62. The portion of the opening 52 adjacent the upper mold section 46 provides an inlet passage 72 adjacent bead 18 and the portion of the opening between the core 32 and lower mold section 44 provides an outlet 74 adjacent the bead 16. Referring again to FIG. 5, the tire casing 20 is then molded by centrifugal casting and may be made of a high modulus material such as a suitable polyurethane of the type previously described for the tread portion but having a modulus of from about 900 to about 2500 psi at 100 percent elongation, a Young's modulus in the range of from about 1450 to about 7250 psi, an ultimate tensile strength in the range of from about 4000 to about 8000 psi at a tensile set in the range of 0 to 10 percent with the preferred tensile set being less than 3 percent at 100 percent elongation. By "tensile set" is meant the extension remaining after a specimen has been stretched and allowed to retract in a specified manner expressed as a percentage of the original length.

The tread portion 22, belt 24 and tire casing 20 are then retained in the mold 30 for a sufficient time to cure these parts of the tire 10. An example of the curing time and temperatures in the mold for a suitable tire 10 is from a few minutes to several hours at temperatures of from about 66° C. to about 177° C. After curing of the tire 10 in the mold 30 the clamping ring 48 is taken off which permits removal of the upper mold section 46, the tread ring 47 and the tire from the mold. The core 32 is disconnected from the flange 34 by removing the nuts and bolts 40 which permits removal of the clamping rings 38 from the core. The core 32 is then removed from the tire 10 by disassembling the segments 66. The tread ring 47 may also be removed from the tread portion 22 by disassembling the segments.

It may be desirable to remove the tire 10 and the mold 30 from the spin caster and place it in a heated curing chamber (not shown) before it is completely cured. The tire 10 and mold 30 are then contained in the curing chamber at substantially the same curing temperatures for a period of time up to several hours such as up to at least three hours until the tire is cured sufficiently to withstand demolding stresses. The tire 10 and mold 30 may then be removed from the curing chamber after which the tire may be removed from the mold and core 32 as described hereinabove. The tire 10 may then be returned to the curing chamber for a period of time necessary to complete the cure and then be removed from the curing chamber and cooled to room temperature.

In the description of this invention, polyurethanes are described and, indeed preferred. Such chemistry is generally known to those having skill in the art. Generally the polyurethane precursors are provided as a liquid reaction mixture which is cast and cured in the mold. The liquid reaction mixture is generally of the conventional prepolymer, quasiprepolymer or one-shot method. Ingredients for the polyurethanes are conventionally polymeric polyols, polyisocynates and a diamine or monomeric polyol, including a triol although usually a diol, curative. A small amount of organic solvent may be used, as necessary, as a carrier; however, for this invention, it is preferred that the solvent is not used at all. The polymeric polyols are typically polyester or polyether polyols having a molecular weight in the range of from about 700 to about 10,000.

In the practice of this invention, it is preferred that the polymeric polyol have a hydroxyl functionality of about 2 in order to enhance the elastomeric characteristic of the polyurethane. The polyurethane is prepared with a slight excess of isocyanate so that the diamine or diol, preferably a diamine curative can react therewith to perform the necessary crosslink or extension.

Where the belt 24 is made of several layers of fabric each layer may be fastened to the tread portion 22 separately in accordance with this invention and separated by centrifugally cast coats of reactive urethane mixture.

While a certain representative embodiment and details have been shown for the purpose of illustrating the invention, it will be apparent to those skilled in the art that various changes and modifications may be made therein without departing from the spirit or scope of the invention.

What is claimed is:

1. A method of molding a toroidal shaped pneumatic tire in a mold having lower and upper mold sections and a tread ring in the lower mold section comprised of a radially outer tread portion, a tire casing underlying said tread portion and a reinforcing cord belt having at least one layer of fabric positioned between said tread portion and said tire casing, said method comprising the steps of:
   (a) forming said tread portion by introducing and centrifugally casting a predetermined quantity of elastomer-forming material into a space at the radially outer portion of said mold in communication with an opening between inner edges of said lower and upper mold sections and molding, reacting and at least partially curing said material to form said tread portion with an inside surface in communication with said opening prior to forming said tire casing;
   (b) centrifugally casting a skim coat of an adhesive on the inside surface of said tread portion in said mold to retain said cord belt on said inside surface during rotational casting of said tire casing;
   (c) positioning said cord belt on the inside surface of said tread portion in said mold with the edges equidistant from a centerplane of said tire after said tread portion is formed in said mold and fastening said cord belt to said tread portion by pressing said cord belt against said tread portion;
   (d) assembling and inserting a core in said mold;
   (e) forming said casing by introducing and rotationally casting a predetermined quantity of liquid reaction mixture of elastomer-forming material into the space between said core, said mold and said tread portion, reacting and at least partially curing said mixture to form said casing overlapping and integrally adhered to said reinforcing cord belt and said tread portion; and
   (f) removing said formed tire and core from said mold and removing said core from said tire.

2. The method of claim 1 wherein said adhesive is a reactive urethane mixture.

3. The method of claim 1 wherein said belt is fastened to said tread portion by staples having a hardness greater than the material of said tread portion extending through said cord belt and penetrating said thread portion and said skim coat of adhesive is centrifugally cast over said belt on said tread portion.

* * * * *